(12) United States Patent
Che et al.

(10) Patent No.: US 7,456,607 B2
(45) Date of Patent: Nov. 25, 2008

(54) CHARGING APPARATUS WITH SELF CLEANING CHARGE AND DISCHARGE ZONE

(75) Inventors: Kenny Che, Vancouver (CA); Yat Shun (Damien) Yu, Burnaby (CA); Karen Cherk Ting Ho, Vancouver (CA)

(73) Assignee: VTech Telecommunications Limited, Tai Pa, New Territory, Hong Kong (CN)

( * ) Notice: Subject to any disclaimer, the term of this patent is extended or adjusted under 35 U.S.C. 154(b) by 207 days.

(21) Appl. No.: 11/322,256

(22) Filed: Jan. 3, 2006

(65) Prior Publication Data

US 2007/0152632 A1    Jul. 5, 2007

(51) Int. Cl.
*H02J 7/00* (2006.01)
(52) U.S. Cl. .................................. 320/112; 320/107
(58) Field of Classification Search ............... 320/112, 320/113, 114, 115, 107; 439/388, 504, 754, 439/756, 759, 860
See application file for complete search history.

(56) References Cited

U.S. PATENT DOCUMENTS

| | | | | |
|---|---|---|---|---|
| 5,157,318 A | * | 10/1992 | Wang | 320/110 |
| 5,826,706 A | * | 10/1998 | Karasik | 200/277 |
| 6,018,230 A | * | 1/2000 | Casey | 320/114 |
| 2004/0017179 A1 | * | 1/2004 | Wu | 320/115 |

* cited by examiner

*Primary Examiner*—Gary L Laxton
*Assistant Examiner*—Ramy Ramadan
(74) *Attorney, Agent, or Firm*—Paul, Hastings, Janofsky & Walker LLP

(57) ABSTRACT

A charging unit including a charge contact and a spring in contact with the charge contact for charging a rechargeable device. The charge contact slidably engages with a charging surface of the rechargeable device and a spring connected to the charge contact applies a force to the charging surface as the charging unit receives the rechargeable device.

13 Claims, 5 Drawing Sheets

CHARGING APPARATUS WITH SELF CLEANING CHARGE AND DISCHARGE ZONE

FIELD OF THE INVENTION

The present invention relates to charging apparatus with a self cleaning charge and discharge zone.

BACKGROUND OF THE INVENTION

Electrical devices powered by rechargeable batteries are widely used. Such electrical devices include, for example, cordless telephone handsets, cellular telephones, power tools, personal digital assistants, handheld computers, and portable music players, just to name a few. In a typical cordless telephone system, a charging unit is typically configured to receive the cordless handset in a cradle of the charging unit. Electrical power from an external source, e.g., a power outlet on a wall, is received by the charging unit and then supplied to the cordless handset via electrical contacts on the charging unit and the cordless handset. These electrical contacts are also hereinafter referred to as charging and discharging zones.

There are problems associated with these electrical contacts. First, they can become fouled, corroded, and/or oxidized over time. This can make it difficult for the charging unit to make sufficient contact with the charging zones of the cordless handset and can prevent full or effective charging of the rechargeable battery within the cordless handset. Additionally, in a traditional charging unit, members of the charging unit in electrical contact with the charging zones make contact with the charging zones at the same time, thereby allowing a static discharge to flow through the rechargeable battery, which may damage the battery.

SUMMARY OF THE INVENTION

The present invention provides for a charging unit that recharges devices powered by a rechargeable power source such as batteries. Although preferred embodiments of the invention that are described herein relate to a cordless telephone handset, the invention can be implemented in other devices, including, for example, cellular phone, personal digital assistants, music players, and so on. An exemplary charging unit of the invention includes a resiliently biased charge contact that can slidably engage the charging surface of the device. The slidable engagement of the charge contact and the charging surface, which produces friction, removes debris of the charging surface, thereby ensuring a more effective contact between the charge contact and the charging surface. A cleaner contact results in a more efficient and reliable charging process. In a preferred implementation of the invention, two charge contacts may be used such that a first charge contact slidably engages the charging surface at a first moment or position within the charging unit and a second charge contact makes contact with the charging surface at a second moment or position within the charging unit, thereby reducing or eliminating a damaging static discharge.

In one embodiment, there is a charging unit which includes a charge contact, and a spring in contact with the charge contact. When the charging unit receives a device, the charge contact slidably engages the charging surface of the device, with the spring applying a force to the charging surface. The device may then be charged through the charge contact. In another embodiment, there is a charging unit which includes a first charge contact and a first spring in contact with the first charge contact. There is also a second charge contact. When the device is inserted into the charging unit in a first position, the first charge contact slidably engages with the charging surface of the device, with the spring applying a force to the charging surface. When the device is inserted into the charging unit in a second position, the second charge contact engages the charging surface of the device. When the device is so positioned, it may be charged through an electrical connection between the first and second charge contacts and the charging surface of the device.

Other objects, features, and advantages of the present invention will be appreciated from the following detailed description, the accompanying drawings, and the appended claims.

DETAILED DESCRIPTION OF AN ILLUSTRATED EMBODIMENT OF THE INVENTION

Figure 1:
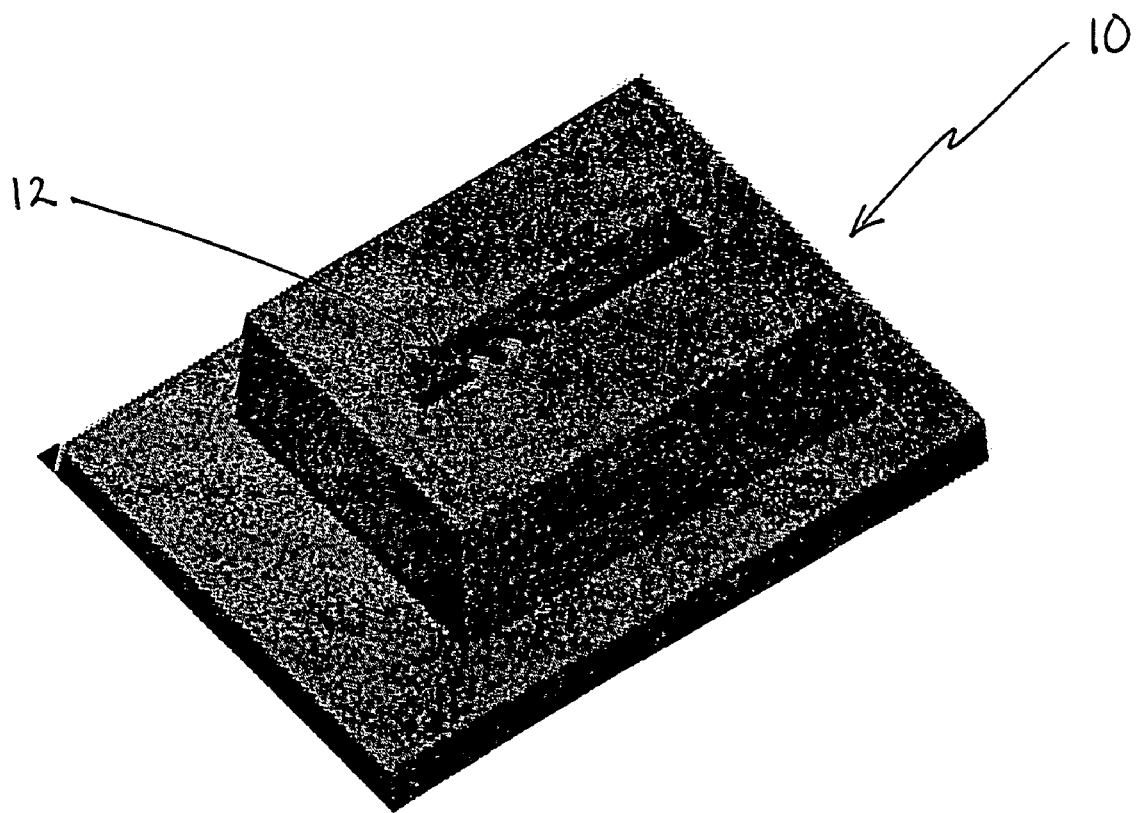
FIG. 1 is a perspective view of a charging unit of the invention.

The figures illustrate a charging unit for use with cordless electrical devices that use rechargeable power sources. FIG. 1 shows exemplary charging unit 10, with a slot 12 configured to receive either the cordless electrical device having a rechargeable power source. The slot 12 can also be configured to receive the rechargeable power source directly.

Figure 2:
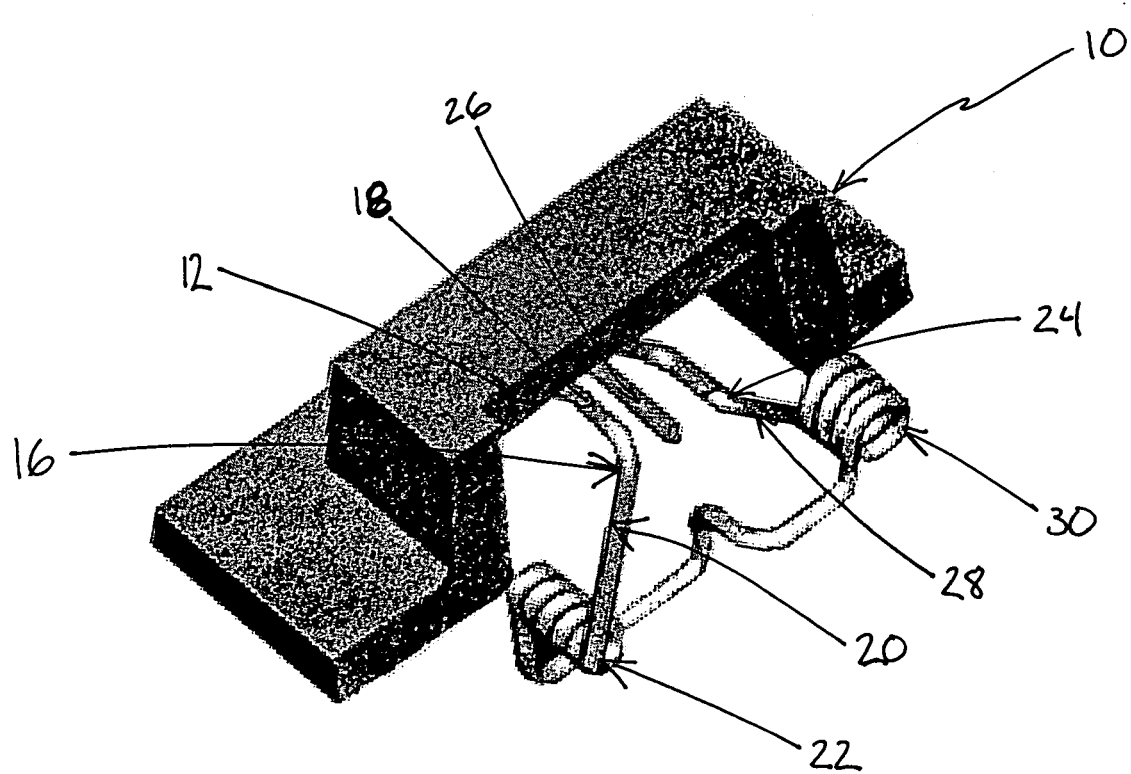
FIG. 2 is an cut-away perspective view of the charging unit of FIG. 1 showing internal components of the charging unit.
Figure 3:
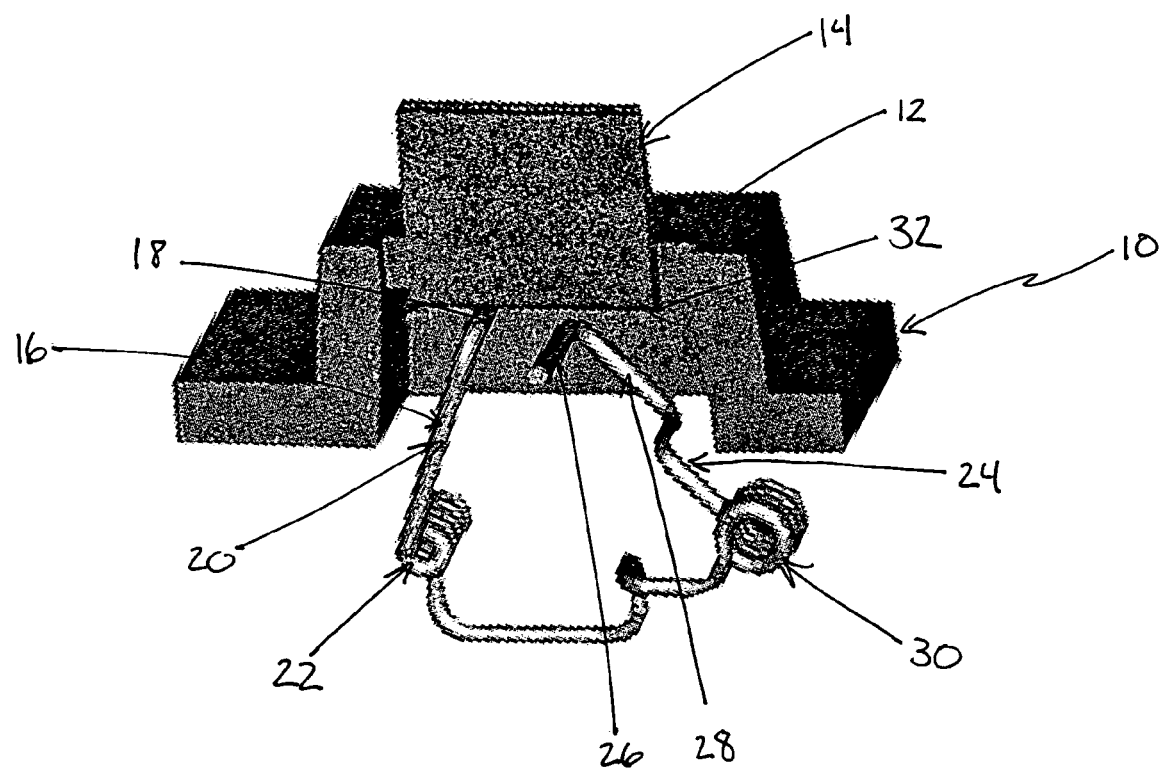
FIG. 3 is a cut-away perspective view of the charging unit of FIG. 1 as it receives a rechargeable device in a first position within the charging unit.
Figure 4:
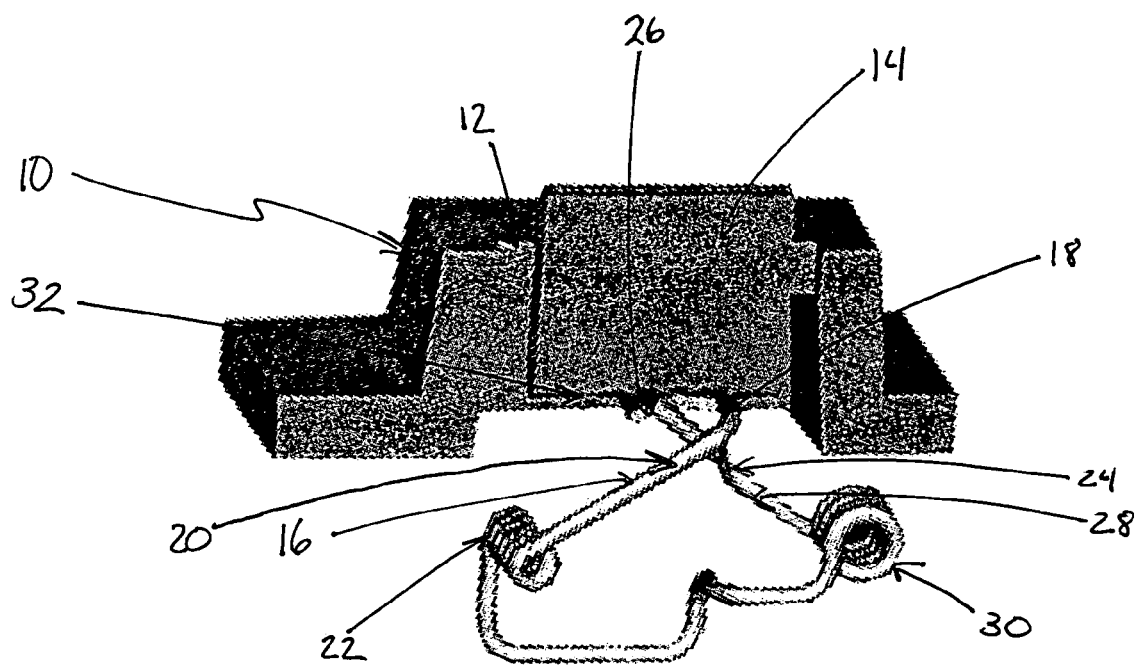
FIG. 4 is a cut-away perspective view of the charging unit of FIG. 1 as it receives a rechargeable device in a second position within the charging unit.

FIG. 2 is cut away perspective view of the charging unit 10, showing internal components. Disposed within the charging unit 10 is a first charge contact 16. The first charge contact 16 has a first contact element 18 and a first radial arm 20. The first radial arm 20 extends from the first contact element 18 to a first spring 22 that applies a resiliently biasing force to the first charge contact 16. There may also be disposed within the charging unit 10 a second charge contact 24 that contains a second contact element 26 and a second radial arm 28. The second radial arm 28 extends from the second contact element 26 to a second spring 30 that applies a resiliently biasing force to the second charge contact 24 that is in the opposite direction of the force applied by the first spring 22 to the first charge contact 16.

The first radial arm 20 and the second radial arm 28 might not be of the same length. In one embodiment, the first radial arm 20 is longer than the second radial arm 28. Thus, if the first spring 22 and the second spring 30 were at approximately the same height, the first contact element 18 would be higher than the second contact element 26. The first radial arm 20 and second radial arm 28 are pointed toward one another such that an incoming surface would cause both radial arms to bend inward.

There is also a rechargeable power source 14 that may, but need not be, attached to a cordless electrical device. The rechargeable power source 14 may take the form of a lithium ion battery or other suitable battery, although any rechargeable power source 14 of suitable design or composition is contemplated. The rechargeable power source 14 has a charging surface 32 which may have one or more charging zones. The charging surface 32 and/or charging zones are typically constructed of metal, although any suitable conductive element may be used. As the rechargeable power source 32 enters the slot 12 of the charging unit 10 in a first position within the charging unit 10, the charging surface 32 of the rechargeable power source 14 makes contact with the first contact element 18 of the first charge contact 16. The charging contacts are in electrical communication with a power source for recharging the rechargeable power source 14.

As the rechargeable power source 14 continues to enter the slot 12 of the charging unit 10 in a second position within the charging unit 10, the spring 22 allows the first charge contact 16 to slidably engage the charging surface 32 of the rechargeable power source 14. In so doing, the first contact element 18 of the first charging contact 16 slides across the charging surface 32 in a first direction, applying a frictional force determined by the force of the spring 22 or other resiliently biasing mechanism. This slidable engagement creates a certain friction between the first contact element 18 and the charging surface 32, thereby scraping or otherwise removing any debris, corrosion, and/or oxidation off of the surface of either the charging surface 32 or the first contact element 18. This scraping action has a cleansing effect and ensures a better conductor-to-conductor contact between the charging unit 10 and the rechargeable power source 14.

Because the first radial arm 20 pivots about the spring 22, it continues in a radial direction as the rechargeable power source 14 continues to enter the charging unit 10 from the first position to the second position. Eventually, the charging surface 32 of the rechargeable power source 14 makes contact with the second contact element 26 of the second charging contact 24. The second contact element 26 of the second charging contact 24 may also slidably engage the charging surface 32 of the rechargeable power source 14, and slides across the charging surface 32 in a second direction that is opposite of the first direction. This second spring 30 thereby applies a force that causes additional scraping and cleansing of the charging surface 32.

If there is an electrostatic imbalance between the first contact element 18 and the charging surface 32, the initial contact between these two surfaces equalizes the electrostatic imbalance. Because the first contact element 18 of the first charging contact 16 and the second contact element 26 of the second charging contact 24 are in electric communication, there is only be one electrostatic spark that occurs between the charging unit 10 and the charging surface 32, even though there may be multiple points of contact between the charging unit 10 and the charging surface 32. By having sequential contacts between the charging unit 10 and the charging surface 32, the second charging contact 26 is in electrostatic equilibrium by the time it slidably engages the charging surface 32. This is designed to reduce the occurrence of damaging sparks which can, among other things, oxidize the charging surface 32.

In addition to allowing for the travel of the charging contacts, the biasing force of the first spring 22 and the second spring 30 ensure that, when the rechargeable power source 14 is completely in the charging unit 10, there is continuous contact between the charging surface 32 and the charging unit 10. This is because the springs bias the first contact element 18 and the second contact element 26 such that they are in constant contact with the charging surface 32

Although the above embodiment discloses the use of multiple charging contacts, it is also possible to design a self-cleaning charging unit 10 using only one charging contact. For example, the slidable engagement of the first contact element 18 of the first charging contact 16 has the same desired effect of scraping unwanted materials off of the charging surface 32 and the first charging contact 16. Thus, a charging unit 10 employing only one charging contact cleans the contact surface 32 and the first contact element 18, thereby providing a cleaner and superior contact to allow for charging.

Figure 5:
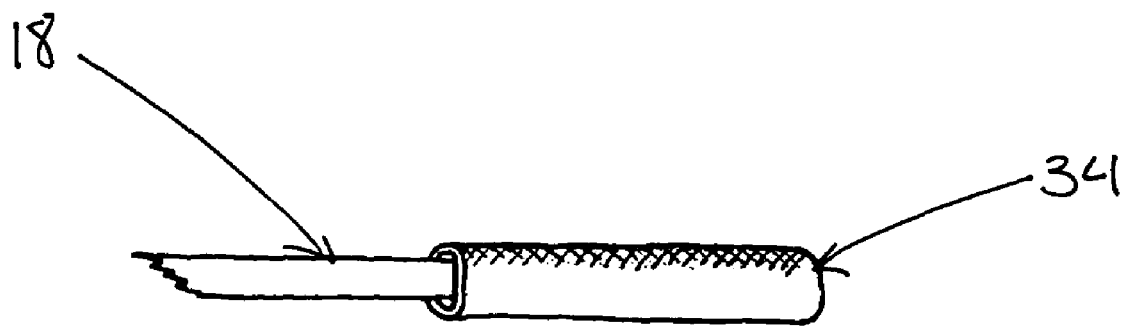
FIG. 5 shows a sleeve for a charge contact of the charging unit of FIG. 1.

FIG. 5 shows another aspect of the invention. A cleansing sleeve 34 may be used to protect first contact element 18 or the second contact element 26, or both. Because of the slidable engagement of the contact elements and the charging surface 32, there may be an erosion of either contact surface over time that may cause the quality and consistency of the contact between the two elements to suffer. Accordingly, a cleansing sleeve 34 may be removably placed over or around the contact elements for making contact with the charging surface 32. When friction causes the cleansing sleeve 34 to deteriorate or become otherwise undesirable, the user may easily replace the cleansing sleeve 34, thereby ensuring a steady and repairable contact between the contact elements and the charging surface 32. The cleansing sleeve 34 may be made of any suitable material, including either conductive or insulating materials.

Although one type of spring is depicted in the figures, the type of spring contemplated by the present invention is not so limited. In fact, helical, conical, torsion, leaf, compression, spiral springs or any suitable type of spring or mechanism for applying a resiliently biasing force is suitable.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A charging unit, comprising:
   a charge contact; and
   a spring in contact with the charge contact;
   wherein when the charging unit receives a device, the charge contact slidably engages with a charging surface of the device and the spring applies a force to the charging surface of the device, and wherein the charge contact slides across the charging surface in a direction transverse to the spring force.

2. The charging unit of claim 1, wherein the device comprises a rechargeable power source.

3. The charging unit of claim 1, wherein the spring is a torsion spring.

4. The charging unit of claim 1, wherein the spring is a spiral spring.

5. The charging unit of claim 1, further comprising a sleeve configured to be removably attached to the charge contact, wherein the sleeve slidably engages with the charging surface of the device.

6. A charging unit, comprising:
a first charge contact;
a first spring in contact with the first charge contact; and
a second charge contact;
wherein when the charging unit receives a device in a first position within the charging unit, the first charge contact slidably engages with a charging surface of the device and the first spring applies a force to the charging surface of the device, and wherein the first charge contact slides across the charging surface in a direction traverse to the first spring force, and
wherein when the charging unit receives the device in a second position within the charging unit, the second charge contact engages with the charging surface of the device.

7. The charging unit of claim 6, further comprising a second spring in contact with the second charge contact, wherein the second charge contact slidably engages with the charging surface when the charging unit receives the device in the second position within the charging unit.

8. The charging unit of claim 7, wherein the first charge contact and the second charge contact are configured to overlap such that the second charge contact engages a common portion of the charging surface.

9. The charging unit of claim 7, wherein the charge contacts and the charging surface are made of metal.

10. The charging unit of claim 7, wherein one or both of the first and second springs are torsion springs.

11. The charging unit of claim 7, wherein one or both of the first and second springs are spiral springs.

12. The charging unit of claim 7, further comprising a sleeve configured to be removably attached to one of the first charge contact, and the second charge contact, wherein the sleeve slidably engages with the charging surface of the device.

13. The charging unit of claim 6, wherein the first and second charge contacts are in electrical communication with each other and with a power source supplying power to the charging unit.

\* \* \* \* \*